United States Patent
Koizumi et al.

(10) Patent No.: US 11,476,654 B2
(45) Date of Patent: Oct. 18, 2022

(54) SINGLE TO MULTIPLE LAYER INTEGRAL BUSBAR STRUCTURE

(71) Applicant: Yazaki Corporation, Tokyo (JP)

(72) Inventors: Koji Koizumi, Shizuoka (JP); Yoshiaki Ichikawa, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 17/348,343

(22) Filed: Jun. 15, 2021

(65) Prior Publication Data

US 2021/0399539 A1  Dec. 23, 2021

(30) Foreign Application Priority Data

Jun. 17, 2020 (JP) .................. JP2020-104361

(51) Int. Cl.
*H02G 5/00* (2006.01)
*H01R 25/14* (2006.01)

(52) U.S. Cl.
CPC ............ *H02G 5/005* (2013.01); *H01R 25/14* (2013.01)

(58) Field of Classification Search
None
See application file for complete search history.

(56) References Cited

U.S. PATENT DOCUMENTS

| | | | | |
|---|---|---|---|---|
| 3,384,856 A | * | 5/1968 | Fisher | H02G 5/08 174/68.2 |
| 3,466,745 A | * | 9/1969 | Alfred | H01B 7/00 174/117 FF |
| 3,639,680 A | * | 2/1972 | Dempsey, Jr. | H02G 5/06 174/117 FF |
| 6,203,343 B1 | * | 3/2001 | Chevassus-More | B60R 16/0207 174/72 B |
| 9,006,571 B2 | * | 4/2015 | Manhart | H02G 5/02 174/88 B |
| D744,949 S | * | 12/2015 | Manhart | D13/121 |
| 9,825,377 B2 | * | 11/2017 | Nishikawa | H01B 5/02 |
| 9,853,435 B1 | * | 12/2017 | Burkman | H01M 50/502 |
| 10,381,751 B2 | * | 8/2019 | Sayo | H01R 4/34 |

(Continued)

FOREIGN PATENT DOCUMENTS

| | | | | |
|---|---|---|---|---|
| CN | 102751673 A | * | 10/2012 | ......... B60R 16/0215 |
| CN | 103026424 A | * | 4/2013 | ......... B60R 16/0215 |

(Continued)

*Primary Examiner* — Timothy J. Dole
*Assistant Examiner* — Muhammed Azam
(74) *Attorney, Agent, or Firm* — Sughrue Mion, PLLC

(57) ABSTRACT

A conductive structure includes: a single-layer busbar that is formed in a plate shape and constitutes a conductive path; and a multi-layer busbar that is configured by laminating a plurality of busbars which are formed as plates thinner than the single-layer busbar and that is joined to an end of the single-layer busbar and constitutes the conductive path. The multi-layer busbar includes a main body portion in which at least some of the laminated plurality of busbars are capable of mutual displacement relative to the busbars adjacent thereto, and a joining end located at a end of the main body portion on the single-layer busbar side and in which the laminated plurality of busbars are incapable of mutual displacement relative to each other, the joining end being joined to the end of the single-layer busbar.

20 Claims, 2 Drawing Sheets

(56) References Cited

U.S. PATENT DOCUMENTS

| | | | |
|---|---|---|---|
| 10,468,161 B2 * | 11/2019 | Kominato | B60R 16/0215 |
| 10,784,667 B2 * | 9/2020 | Sayo | H02G 5/005 |
| 10,907,268 B2 * | 2/2021 | Nakagawa | B32B 27/34 |
| 11,043,720 B2 * | 6/2021 | Gonzales | H01M 50/50 |
| 11,218,080 B2 * | 1/2022 | Doo | H02G 5/005 |
| 2002/0112317 A1 * | 8/2002 | Hayashi | B60R 16/0215 16/86 C |
| 2004/0069527 A1 * | 4/2004 | Vanhoutte | H02G 5/005 174/149 B |
| 2006/0278423 A1 | 12/2006 | Ichikawa et al. | |
| 2016/0152197 A1 | 6/2016 | Kugimiya et al. | |
| 2017/0298909 A1 * | 10/2017 | Alefelder | H02G 5/06 |
| 2018/0174716 A1 * | 6/2018 | Kominato | H01B 13/01254 |
| 2018/0269671 A1 * | 9/2018 | Mattmuller | H02G 5/005 |
| 2018/0326931 A1 * | 11/2018 | Naganishi | B60R 16/023 |
| 2019/0013631 A1 * | 1/2019 | Heusler | H01R 25/162 |
| 2019/0084505 A1 * | 3/2019 | Ozaki | H01R 4/58 |
| 2019/0348828 A1 * | 11/2019 | Preising | H02G 5/005 |
| 2020/0153124 A1 * | 5/2020 | Scharkowski | H01R 11/12 |
| 2020/0389005 A1 * | 12/2020 | Koizumi | B60R 16/0215 |

FOREIGN PATENT DOCUMENTS

| | | | | |
|---|---|---|---|---|
| CN | 103079896 A * | 5/2013 | | H01B 7/009 |
| CN | 103403979 A * | 11/2013 | | H01B 13/06 |
| CN | 104466567 A * | 3/2015 | | H01B 1/02 |
| CN | 104716443 A * | 6/2015 | | H01R 13/025 |
| CN | 107801333 A * | 3/2018 | | |
| CN | 108962452 A * | 12/2018 | | |
| CN | 109493996 A * | 3/2019 | | H01B 5/00 |
| CN | 110323594 A * | 10/2019 | | H01R 11/12 |
| CN | 111724928 A * | 9/2020 | | |
| CN | 111883949 A * | 11/2020 | | |
| CN | 112072421 A * | 12/2020 | | B23P 19/06 |
| CN | 113809609 A * | 12/2021 | | H01R 25/14 |
| DE | 42 10 202 A1 | 9/1993 | | |
| DE | 102005036976 A1 * | 3/2006 | | H01R 4/029 |
| DE | 10 2005 054 926 A1 | 6/2006 | | |
| DE | 20 2009 009 607 U1 | 9/2009 | | |
| DE | 20 2009 009 607 U1 | 10/2009 | | |
| DE | 102009032242 A1 * | 1/2011 | | H02G 5/005 |
| DE | 102011087154 A1 * | 12/2012 | | H01R 13/518 |
| DE | 112013005709 T5 * | 9/2015 | | H01B 13/065 |
| DE | 112015000915 T5 * | 10/2016 | | B60K 6/22 |
| DE | 102015220115 A1 * | 4/2017 | | B60L 1/00 |
| DE | 202017101500 U1 * | 5/2017 | | B60L 11/00 |
| DE | 102016124963 A1 * | 6/2018 | | B60L 5/38 |
| DE | 102018000284 A1 * | 7/2018 | | |
| DE | 102018104083 A1 * | 9/2018 | | H01B 5/02 |
| DE | 102017116444 A1 * | 10/2018 | | |
| DE | 102017116445 A1 * | 10/2018 | | |
| DE | 102017116446 A1 * | 10/2018 | | |
| DE | 102018205912 A1 * | 10/2018 | | H01M 10/6553 |
| DE | 112017003126 T5 * | 5/2019 | | B60R 16/0207 |
| DE | 102018001228 B3 * | 7/2019 | | |
| DE | 102016123036 B4 * | 8/2019 | | B60R 16/0215 |
| EP | 3358048 A1 * | 8/2018 | | C25D 3/12 |
| EP | 3702219 A1 | 9/2020 | | |
| EP | 3925834 A1 * | 12/2021 | | H01R 25/14 |
| EP | 3928911 A1 * | 12/2021 | | H01R 4/029 |
| JP | 63-128625 U | 8/1988 | | |
| JP | 63-250082 A | 10/1988 | | |
| JP | 2004227806 A * | 8/2004 | | H02G 5/005 |
| JP | 2010-167427 A | 8/2010 | | |
| JP | 2014090115 A * | 5/2014 | | B29C 70/84 |
| JP | 6644730 B2 * | 2/2020 | | B60R 16/0215 |
| KR | 100567755 B1 * | 4/2006 | | |
| KR | 100609449 B1 * | 8/2006 | | |
| KR | 20090081903 A * | 7/2009 | | |
| KR | 20100083413 A * | 7/2010 | | |
| KR | 20150089050 A * | 8/2015 | | |
| KR | 10-2015-0101154 A | 9/2015 | | |
| KR | 20150002219 U * | 6/2016 | | |
| KR | 20170068371 A * | 6/2017 | | |
| KR | 20170089568 A * | 8/2017 | | |
| KR | 20170130238 A * | 11/2017 | | |
| KR | 20200029424 A * | 3/2020 | | |
| KR | 20200030043 A * | 3/2020 | | |
| KR | 102101451 B1 * | 4/2020 | | |
| KR | 20200116880 A * | 10/2020 | | |
| KR | 20210019296 A * | 2/2021 | | |
| KR | 20220037225 A * | 3/2022 | | |
| WO | WO-0229939 A1 * | 4/2002 | | H01R 13/035 |
| WO | WO-2010125426 A1 * | 11/2010 | | H05K 1/0263 |
| WO | WO-2012000731 A * | 1/2012 | | H02G 5/007 |
| WO | WO-2012135673 A2 * | 10/2012 | | H02B 1/20 |
| WO | WO-2016002770 A1 * | 1/2016 | | C22C 9/00 |
| WO | WO-2018021084 A1 * | 2/2018 | | H01M 2/20 |
| WO | WO-2018091021 A1 * | 5/2018 | | H02G 5/005 |
| WO | WO-2019082731 A * | 5/2019 | | H01B 5/02 |
| WO | WO-2021050609 A1 * | 3/2021 | | |
| WO | WO-2021096223 A1 * | 5/2021 | | |

* cited by examiner

SINGLE TO MULTIPLE LAYER INTEGRAL BUSBAR STRUCTURE

CROSS-REFERENCE TO RELATED APPLICATION(S)

The present application claims priority to and incorporates by reference the entire contents of Japanese Patent Application No. 2020-104361 filed in Japan on Jun. 17, 2020.

BACKGROUND OF THE INVENTION

1. Field of the Invention

The present invention relates to a conductive structure.

2. Description of the Related Art

As technology relating to a conductive structure that constitutes a conductive path in a vehicle, Japanese Patent Application Laid-open No. 2010-167427 discloses a flexible conductor that is provided with a laminated body, a terminal portion, and a protective plate, for example. The laminated body is formed by laminating a plurality of thin plates and has conductivity and flexibility characteristics. The terminal portion is provided at both ends of the laminated body. The protective plate is disposed in the join section between the terminal portion and the laminated body and prevents the thin plates from being lifted up.

Incidentally, the flexible conductor disclosed in Japanese Patent Application Laid-open No. 2010-167427 above has room for further improvement in terms of a configuration, for example, in vehicles that would enable a conductive path for conducting power and electrical signals to be laid more appropriately.

SUMMARY OF THE INVENTION

An object of the present invention, which was conceived in view of the foregoing problem, is to provide a conductive structure that enables a conductive path to be appropriately provided.

In order to achieve the above mentioned object, a conductive structure according to one aspect of the present invention includes a single-layer busbar that is formed in a plate shape and constitutes a conductive path of a vehicle; and a multi-layer busbar that is configured by laminating a plurality of busbars which are formed as plates thinner than the single-layer busbar and that is joined to an end of the single-layer busbar and constitutes the conductive path, wherein the multi-layer busbar includes a main body portion in which at least some of the laminated plurality of busbars are capable of mutual displacement relative to the busbars adjacent thereto, and a joining end located at an end of the main body portion on the single-layer busbar side and in which the laminated plurality of busbars are incapable of mutual displacement relative to each other, the joining end being joined to the end of the single-layer busbar.

According to another aspect of the present invention, in the conductive structure, it is possible to configure that the single-layer busbar has a higher rigidity than that of the main body portion of the multi-layer busbar and constitutes a route regulation portion that regulates an installation route, and the multi-layer busbar has a higher flexibility than that of the single-layer busbar and constitutes a deformation allowance portion that allows deformation.

According to still another aspect of the present invention, in the conductive structure, it is possible to configure that the multi-layer busbar includes an attachment end that is located at the end of the main body portion on the side opposite to the joining end side, and in which the laminated plurality of busbars are incapable of mutual displacement relative to each other.

According to still another aspect of the present invention, in the conductive structure, it is possible to further include an insulating coating that covers and insulates outer surfaces of the single-layer busbar and the multi-layer busbar.

According to still another aspect of the present invention, in the conductive structure, it is possible to configure that in the multi-layer busbar, the laminated plurality of busbars are in mutual contact and are conductive.

According to still another aspect of the present invention, in the conductive structure, it is possible to configure that a length along a direction of extension of the single-layer busbar is longer than a length along the direction of extension of the multi-layer busbar.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment according to the present invention will be described in detail hereinbelow on the basis of the drawings. Note that the present invention is not limited to or by this embodiment. Furthermore, the constituent elements of the following embodiment include constituent elements that could be easily substituted by a person skilled in the art or which are substantially the same.

Embodiment

Figure 1:
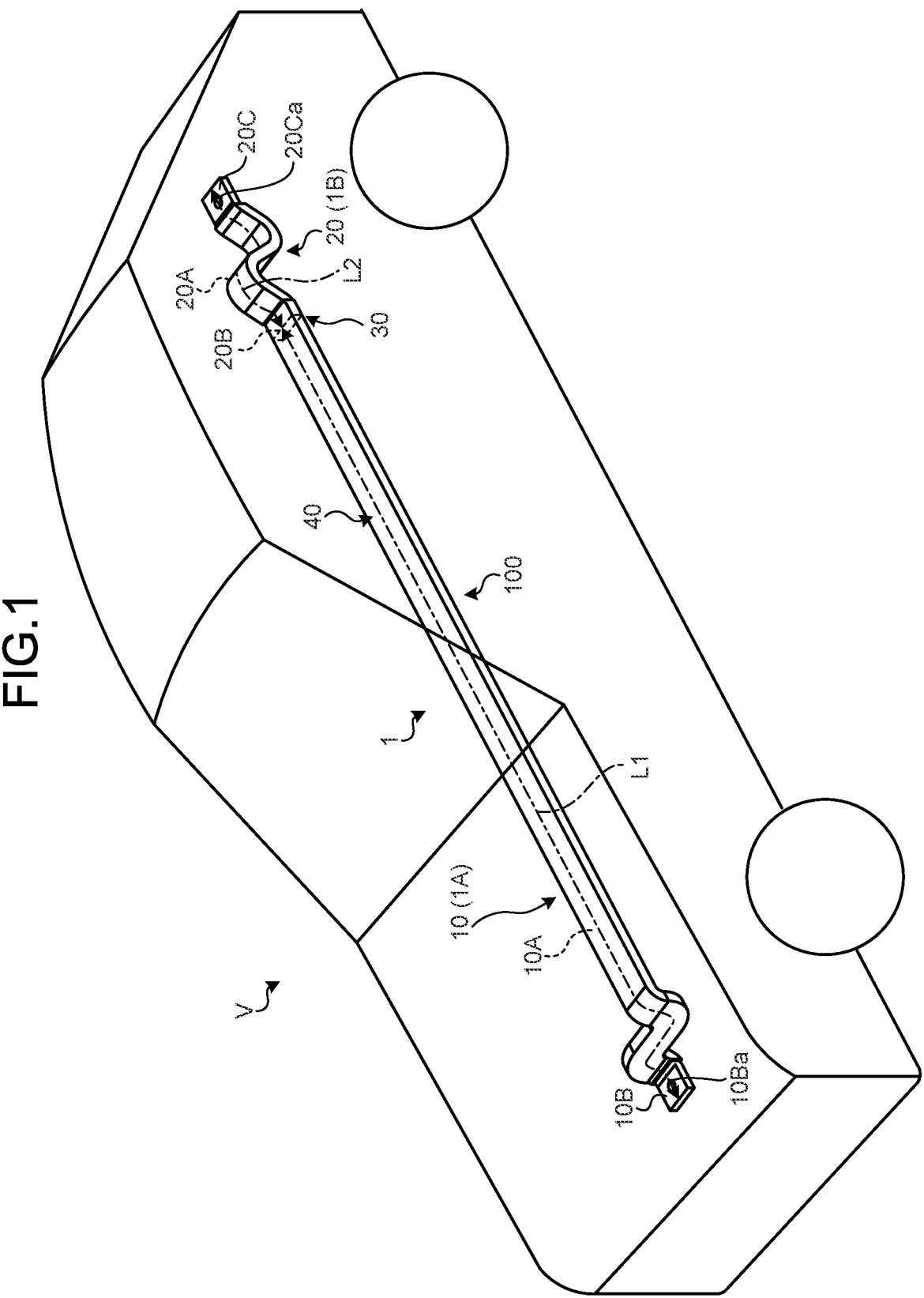
FIG. 1 is a schematic perspective view of a schematic configuration of a conductive structure according to an embodiment.

A conductive structure 1 of the present embodiment illustrated in FIG. 1 is applied to a vehicle V and constitutes a structural mounting module that interconnects devices installed in the vehicle V and that is used to supply power and for signal communication. The conductive structure 1 transmits power and electrical signals to various equipment installed in the vehicle V. The conductive structure 1 of the present embodiment is provided with a single-layer busbar 10 and a multi-layer busbar 20 and, by combining the single-layer busbar 10 and multi-layer busbar 20, a continuous conductive path 100 is configured, thereby enabling the conductive path 100 to be appropriately provided in the vehicle V.

The conductive structure 1 is typically formed as a long object that extends in the form of a strip between various equipment. The conductive path 100 configured from the conductive structure 1 is connected to various equipment in the vehicle V and constitutes a transmission line that transmits electricity. The conductive path 100 typically constitutes a power system transmission line that transmits electric power to drive equipment or a communication system transmission line that transmits electrical signals which are inputted/outputted to/from the equipment. Configurations of the conductive structure 1 will each be described in detail hereinbelow with reference to the drawings.

Figure 2:
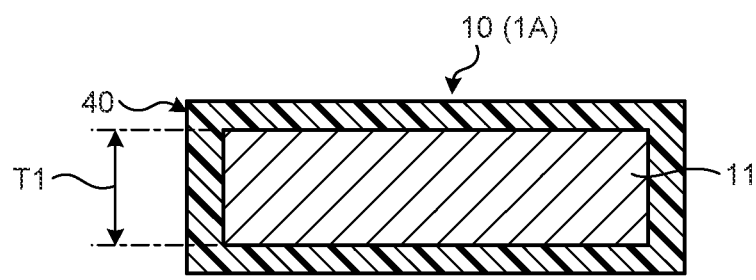
FIG. 2 is a schematic cross-sectional view of a schematic configuration of a single-layer busbar of the conductive structure according to the embodiment.

As illustrated in FIG. 2, the single-layer busbar 10 is conductive, is formed as a plate, and constitutes part of the conductive path 100 of the vehicle V. The single-layer busbar 10 is configured from one thick plate-shaped busbar 11. In other words, the single-layer busbar 10 is configured from the busbar 11, which has a single-layer structure.

Figure 3:
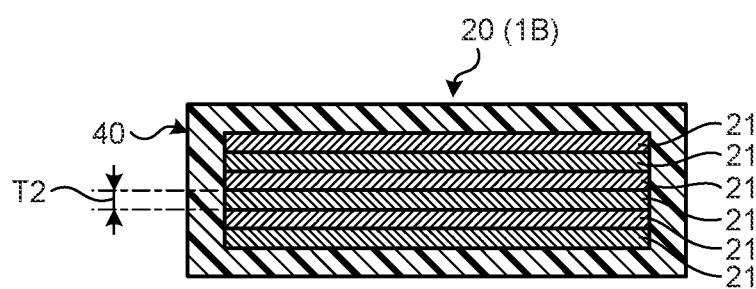
FIG. 3 is a schematic cross-sectional view of a schematic configuration of a multi-layer busbar of the conductive structure according to the embodiment.

On the other hand, as illustrated in FIG. 3, the multi-layer busbar 20 is a laminated body that is configured by laminating a plurality of busbars 21, and is joined to an end of the single-layer busbar 10 so as to constitute part of the conductive path 100. The plurality of busbars 21 constituting the multi-layer busbar 20 are each conductive and are formed as plates thinner than the single-layer busbar 10. That is, the multi-layer busbar 20 is configured from the plurality of thin plate-shaped busbars 21. In other words, the multi-layer busbar 20 is configured from the plurality of the busbars 21, which have a multi-layer structure.

The busbars 11 and 21 are formed from a conductive metal material such as, for example, copper, copper alloy, aluminum, or an aluminum alloy, or the like. The busbars 11 and 21 are flat plate-shaped conductors formed with a substantially rectangular plate shape. The busbars 11 and 21 are formed as long objects that extend like strips. The busbars 11 and 21 extend along the conductive path 100, and the cross-sectional shape perpendicular to a direction of extension is formed with a substantially rectangular shape (see FIGS. 2 and 3). The busbars 11 and 21 are formed so as to extend with substantially the same cross-sectional shape with respect to the direction of extension.

Further, as mentioned earlier, the busbar 11 is formed with a thick plate shape of which a thickness T1 along the plate thickness direction (a short-side direction of the foregoing cross-sectional shape) is thicker than a thickness T2 along the plate thickness direction of the busbar 21. In other words, as mentioned earlier, the busbar 21 is formed with a shape of which thickness T2 along the plate thickness direction is thinner than thickness T1 along the plate thickness direction of the busbar 11. Due to this configuration, the busbar 11 is configured in the form of a thick plate that is sufficiently rigid on its own compared to the busbar 21. This busbar 11 constitutes a single-layer busbar 10 on its own. On the other hand, the busbar 21 is configured as a thin plate that is sufficiently flexible on its own compared to the busbar 11. More specifically, the busbar 21 has favorable flexibility in the plate thickness direction. A plurality of the busbar 21 are stacked and laminated along the plate thickness direction to constitute the multi-layer busbar 20. The plurality of busbars 21 constituting the multi-layer busbar 20 are typically made of mutually identical, materials and formed with mutually identical cross-sectional shapes orthogonal to the direction of extension; the direction of extension, the plate thickness direction, and a width direction are mutually coincident.

The single-layer busbar 10 is configured from the thick plate-shaped busbar 11 of a single-layer structure as mentioned earlier, and constitutes a route regulation portion 1A in the conductive structure 1. On the other hand, the multi-layer busbar 20 is configured from the plurality of thin plate-shaped busbars 21 of a multi-layer structure as mentioned earlier, and constitutes a deformation allowance portion 1B in the conductive structure 1.

The route regulation portion 1A configured from the single-layer busbar 10 has a higher rigidity in the conductive structure 1 than that of a main body portion 20A (described subsequently) of the multi-layer busbar 20 and constitutes a section for regulating the installation route of the conductive structure 1. The route regulation portion 1A is capable of regulating the installation route of the conductive structure 1 by being formed in a shape corresponding to the installation route in the vehicle V. In other words, the route regulation portion 1A has a high shape-retaining function.

On the other hand, the deformation allowance portion 1B configured from the multi-layer busbar 20 has a higher flexibility in the conductive structure 1 than that of the single-layer busbar 10 and constitutes a section for allowing deformation of the conductive structure 1. The deformation allowance portion 1B typically suitably allows deformation of the busbar 21 in the plate thickness direction. The deformation allowance portion 1B is capable of improving installation workability by allowing deformation when the conductive structure 1 is installed in the vehicle V. In other words, the deformation allowance portion 1B has a relatively high shape-changing function.

In the conductive structure 1 according to the present embodiment, the route regulation portion 1A formed of the single-layer busbar 10 and the deformation allowance portion 1B formed of the multi-layer busbar 20 are used separately according to the installation position in the vehicle V, and the like. This configuration enables the conductive structure 1 to achieve an appropriate balance between flexibility and rigidity as necessary depending on each area, and to ensure favorable workability and handling, and so forth.

In the conductive structure 1 according to the present embodiment, the multi-layer busbar 20 constituting the deformation allowance portion 1B is joined to one end of the single-layer busbar 10 constituting the route regulation portion 1A. Further, in the conductive structure 1 according to the present embodiment, a length L1 along the direction of extension of the single-layer busbar 10 that constitutes the route regulation portion 1A is longer in relative terms than a length L2 along the direction of extension of the multi-layer busbar 20 that constitutes the deformation allowance portion 1B (see FIG. 3). In other words, in the conductive structure 1 according to the present embodiment, length L2 along the direction of extension of the multi-layer busbar 20 that constitutes the deformation allowance portion 1B is shorter in relative terms than length L1 along the direction of extension of the single-layer busbar 10 that constitutes the route regulation portion 1A.

More specifically, the single-layer busbar 10 is configured to include a main body portion 10A and an attachment end 10B. The main body portion 10A and the attachment end 10B of the single-layer busbar 10 are configured entirely from the busbar 11 which has a single-layer structure.

The main body portion 10A is the main section of the single-layer busbar 10 that constitutes the route regulation portion 1A. The main body portion 10A is formed by being bent into a shape corresponding to the installation route in the vehicle V. Here, the main body portion 10A is formed, at the end on the attachment end 10B side, with bent portions at a plurality of points according to the installation route. The main body portion 10A is made by bending and plastically deforming the thick plate-shaped busbar 11, which has high rigidity as mentioned earlier, into a shape corresponding to the installation route by using various equipment for bending, or the like, for example, and this shape is retained. With this configuration, the main body portion 10A has a higher rigidity than that of the main body portion 20A (described subsequently) of the multi-layer busbar 20, and is capable of constituting the route regulation portion 1A that regulates the installation route of the conductive structure 1.

The attachment end 10B is located at an end of the main body portion 10A on the side opposite to the end on the side joined to the multi-layer busbar 20, and is the section which is attached to various equipment. The attachment end 10B is, for example, electrically connected to various equipment through bolt fastening, various types of welding, and the like, and is conductive. In FIG. 1, for example, the attachment end 10B is formed with a bolt fastening hole 10Ba, and is illustrated as being bolted to various equipment using bolts via the bolt fastening hole 10Ba.

The multi-layer busbar 20 is configured to include the main body portion 20A, a joining end 20B, and an attachment end 20C. The main body portion 20A, the joining end 20B, and the attachment end 20C of the multi-layer busbar 20 are entirely configured from a plurality of the busbars 21 which have a multi-layer structure.

The main body portion 20A is the main section of the multi-layer busbar 20 that constitutes the deformation allowance portion 1B. The main body portion 20A is a section where at least some of the laminated plurality of busbars 21 are capable of mutual displacement relative to the adjacent busbars 21. Here, in the main body portion 20A, all of the laminated plurality of busbars 21 are capable of mutual displacement relative to adjacent busbars 21. The main body portion 20A is not welded, ultrasonically bonded, bonded using an electrically conductive adhesive, thermocompression-bonded, or the like, as described subsequently, at the joining end 20B or the attachment end 20C, for example, and adjacent busbars 21 are made flexible, thereby constituting an interlayer displacement allowance portion. Due to this configuration, the main body portion 20A has a higher flexibility than that of the single-layer busbar 10 and is capable of constituting the deformation allowance portion 13 which allows deformation of the conductive structure 1. The main body portion 20A constituting the deformation allowance portion 1B typically suitably allows deformation of the busbar 21 in the plate thickness direction, as mentioned earlier.

The joining end 20B is located at an end of the main body portion 20A on the single-layer busbar 10 side, and is the section that is joined to the end of the single-layer busbar 10. On the other hand, the attachment end 20C is located at an end of the main body portion 20A on the side opposite to the joining end 20B side, that is, at the end on the side opposite to the end on the side joined to the single-layer busbar 10 at the main body portion 20A, and is the section that is attached to various equipment.

The joining end 20B and the attachment end 20C are both sections in which the laminated plurality of busbars 21 are incapable of mutual displacement relative to each other. Here, in the joining end 20B and the attachment end 20C, all of the laminated plurality of busbars 21 are incapable of mutual displacement relative to the adjacent busbars 21. In the joining end 20B and the attachment end 20C, the adjacent busbars 21 are fixed and integrated together using various techniques such as welding, ultrasonic bonding, bonding using an electrically conductive adhesive, or thermocompression, for example, so as to be incapable of displacement relative to each other, thereby constituting an interlayer displacement-restraining portion. Due to this configuration, the joining end 20B and the attachment end 20C both have a higher rigidity than that of the main body portion 20A, and the multi-layer busbar 20 can be maintained in a state where the plurality of busbars 21 are bundled together as a laminated body.

Further, the joining end 20B is joined to an end of the main body portion 10A of the single-layer busbar 10 on the side opposite to the attachment end 10B side, and constitutes a connecting portion 30 that connects the single-layer busbar 10 to the multi-layer busbar 20. The joining end 20B is joined to the main body portion 10A of the single-layer busbar 10 by using various techniques such as laser joining, ultrasonic bonding, or frictional jointing, for example. The joining end 20B may also be joined to the main body portion 10A of the single-layer busbar 10 by using bolting or the like, for example. Due to this configuration, the multi-layer busbar 20 is electrically connected to the main body portion 10A of the single-layer busbar 10 via the joining end 20B, and is conductive.

On the other hand, like the aforementioned attachment end 10B, the attachment end 20C is electrically connected to various equipment using bolt fastening and various types of welding, and the like, for example, and is conductive. In FIG. 1, for example, the attachment end 20C is formed with a bolt fastening hole 20Ca similarly to the attachment end 10B, and is illustrated as being bolted to various equipment using bolts via the bolt fastening hole 20Ca. Here, the bolt fastening hole 20Ca is formed so as to penetrate the plurality of busbars 21 constituting the attachment end 20C so as to span the plurality of busbars 21.

Furthermore, the conductive structure 1 according to the present embodiment is provided with an insulating coating 40 that covers and insulates outer surfaces of the single-layer busbar 10 and the multi-layer busbar 20.

The insulating coating 40 is a busbar coating that is formed from an insulating resin material, that is provided in contact with the outer surfaces of the single-layer busbar 10 and the multi-layer busbar 20, and that covers and insulates these outer surfaces. The insulating coating 40 according to the present embodiment collectively covers and insulates the whole of the main body portion 10A, the main body portion 20A, and the joining end 20B of the single-layer busbar 10 and the multi-layer busbar 20, respectively, whereas the attachment end 10B and the attachment end 20C are exposed via the insulating coating 40.

The insulating coating 40 is formed, for example, by extrusion molding a resin material (PP (polypropylene), PVC (polyvinyl chloride), cross-linked PE (polyethylene), or the like. The material is suitably selected by considering abrasion resistance, chemical resistance, heat resistance, and the like) on the outer surface side of the main body portion 10A, the main body portion 20A, and the joining end 20B. The insulating coating 40 may also be formed, for example, using a dipping process to coat the main body portion 10A, the main body portion 20A, and the joining end 20B by immersing same in resin material. The insulating coating 40 may also be formed, for example, using a spraying process to coat the main body portion 10A, the main body portion 20A, and the joining end 20B by spraying same with a resin material. Further, the insulating coating 40 may also be formed, for example, by bonding heat-shrinkable tubing, which is formed into a tube shape using resin material, to the outer surfaces of the main body portion 10A, the main body portion 20A, and the joining end 20B, and heating and heat-shrinking the heat-shrinkable tubing.

In the multi-layer busbar 20 according to the present embodiment, the laminated plurality of busbars 21 are in mutual contact and are conductive in a state of being coated with the foregoing insulating coating 40 (see FIG. 3). Here, in the multi-layer busbar 20, all of the laminated plurality of busbars 21 are in mutual contact with adjacent busbars 21, and are conductive. In other words, in the multi-layer busbar 20, the plurality of busbars 21 are laminated in mutual contact such that the insulating coating 40 is not interposed between adjacent busbars 21 of the laminated plurality of busbars 21. Due to this configuration, in the case of the multi-layer busbar 20 according to the present embodiment, all the busbars 21 constituting the multi-layer busbar 20 are at substantially the same potential.

The conductive structure 1 described hereinabove constitutes the conductive path 100 of the vehicle V using the single-layer busbar 10 and the multi-layer busbar 20. The multi-layer busbar 20 is configured by laminating a plurality of busbars 21 which are formed as plates thinner than the single-layer busbar 10. Further, in the case of the multi-layer busbar 20, the laminated plurality of busbars 21 are capable of mutual relative displacement in the main body portion 20A, whereas, in the case of the joining end 20B joined to the single-layer busbar 10, the laminated plurality of busbars 21 are not capable of mutual relative displacement. Due to this configuration, while the single-layer busbar 10 of the conductive structure 1 functions as a rigid portion, the main body portion 20A of the multi-layer busbar 20 functions as a flexible portion, and on that basis, both can be reliably joined via the joining end 20B in a state where the plurality of busbars 21 are collectively bundled together as a laminated body. As a result, the conductive structure 1 enables the conductive path 100 to be appropriately provided.

More specifically, in the conductive structure 1 described hereinabove, the single-layer busbar 10 constitutes the route regulation portion 1A, and the multi-layer busbar 20 constitutes the deformation allowance portion 1B. Due to this configuration, by separately using the route regulation portion 1A and the deformation allowance portion 1B according to the installation position and the like in the vehicle V, the conductive structure 1 enables an appropriate balance between flexibility and rigidity to be achieved as necessary depending on each area. Accordingly, the conductive structure 1 makes it possible to ensure favorable installation workability and favorable handling, and the like, even in a case where the conductive structure 1 has a larger current and a larger cross-section.

For example, in the conductive structure 1, the route regulation portion 1A, which is configured from the single-layer busbar 10, has a relatively high rigidity in the conductive structure 1, and thus the section of the route regulation portion 1A has a relatively high shape-retaining function. Due to this configuration, the conductive structure 1 can, using the section of the route regulation portion 1A, be afforded a structure that facilitates maintenance of the shape according to the installation position of the conductive path 100 in the vehicle V. As a result, the conductive structure 1 enables the installation path of the conductive path 100 to be regulated by means of the route regulation portion 1A even without the use of an exterior material such as corrugated tubing, for example, thus also enabling the number of fixings such as clamps to be curbed.

On the other hand, in the conductive structure 1, the deformation allowance portion 1B configured from the multi-layer busbar 20 has a relatively high flexibility in the conductive structure 1, and thus the section of the deformation allowance portion 1B has a relatively high shape-changing function. Due to this configuration, the conductive structure 1 is capable, using the section of the deformation allowance portion 1B, of flexibly responding to changes and micro-adjustments to the installation route of the conductive path 100. For example, the conductive structure 1 is capable of absorbing various tolerances and variations due to the deformation allowance portion 1B deforming in the plate thickness direction of the busbar 21 during attachment to the vehicle V and during connection to various parts, thereby improving the ease of installation to the vehicle V.

As a result, the conductive structure 1 is capable, using the route regulation portion 1A, of maintaining its shape according to the installation route of the conductive path 100 and also of securing mobility by means of the deformation allowance portion 1B. Furthermore, under this premise, the conductive structure 1 according to the present embodiment makes it possible to provide the conductive path 100 more appropriately in the vehicle V.

Here, in the conductive structure 1 described hereinabove, in the multi-layer busbar 20, the laminated plurality of busbars 21 are made incapable of mutual displacement relative to each other, even at the attachment end 20C on the side of the main body portion 20A opposite to the joining end 20B side. Due to this configuration, in the conductive structure 1, the attachment end 105 is electrically connected to various equipment in a state where the plurality of busbars 21 are bundled together as a laminated body at both ends of the multi-layer busbar 20. As a result, the conductive structure 1 is capable, for example, of facilitating assembly, in equipment, of the attachment end 10B in a state where each bolt fastening hole 20Ca, which is formed so as to span the plurality of busbars 21 constituting the attachment end 20C, is appropriately aligned, thus enabling assembly workability to be improved. In this regard also, the conductive structure 1 enables the conductive path 100 to be appropriately provided.

Furthermore, in the conductive structure 1 described hereinabove, the single-layer busbar 10 and the multi-layer busbar 20 can be suitably collectively coated with the insulating coating 40.

In this case, in the conductive structure 1 described hereinabove, the laminated plurality of busbars 21 in the multi-layer busbar 20 are in mutual contact and are conductive without the insulating coating 40 being interposed therebetween. Due to this configuration, the conductive structure 1 can be configured to easily respond to demands such as for a higher current in the vehicle V or a larger cross-section for the conductive path 100. Moreover, the conductive structure 1 makes it possible to ensure that the plurality of busbars 21 constituting the multi-layer busbar 20 are at substantially the same potential, and is capable of suppressing any bias in the current in the plurality of busbars 21, thus stabilizing the conduction performance.

Furthermore, in the conductive structure 1 described hereinabove, the single-layer busbar 10 is formed relatively long, and the multi-layer busbar 20 is formed relatively short. Due to this configuration, the conductive structure 1 enables the area of the multi-layer busbar 20 which tends to be relatively expensive to be restrained, for example, and the multi-layer busbar 20 can be provided as necessary, thus making it possible to appropriately provide the conductive path 100 while curbing manufacturing costs.

Note that the conductive structure pertaining to the foregoing embodiment of the present invention is not limited to or by the foregoing embodiment, rather, a variety of modifications are possible within the scope set forth in the patent claims.

The conductive structure 1 described above is suitably used for power system transmission lines (so-called highvoltage systems) but may also be used for communication system transmission lines (so-called low-voltage systems).

Although the plurality of busbars 21 constituting the multi-layer busbar 20 are described in the foregoing description as typically being formed from mutually identical materials and formed with mutually identical cross-sectional shapes orthogonal to the direction of extension, the busbars 21 are not limited to being thus configured. The plurality of busbars 21 constituting the multi-layer busbar 20 may also be formed from a mixture of different materials or with a mixture of different thicknesses T2 and the like.

Although the multi-layer busbar 20 is described in the foregoing description as being formed such that all of the laminated plurality of busbars 21 are in mutual contact with adjacent busbars 21 and are conductive, and all the busbars 21 are at substantially the same potential, the multi-layer busbar 20 is not limited to being thus configured. In the multi-layer busbar 20, some of the plurality of busbars 21 may also be in mutual contact with the adjacent busbars 21 and conductive while the remaining busbars 21 are insulated, or all of the plurality of busbars 21 may be mutually isolated from the adjacent busbars 21. For example, the insulating coating 40 may also be provided to the laminated plurality of busbars 21 so as to be interposed between and insulate the adjacent busbars 21. Furthermore, the insulating coating 40 does not need to be provided to begin with.

In the foregoing description, the multi-layer busbar 20 is described as being joined to one end of the single-layer busbar 10, but one multi-layer busbar 20 may also be joined to each of the two ends of the single-laver busbar 10.

In the foregoing description, the laminated plurality of busbars 21 of the attachment end 20C are described as being incapable of mutual displacement relative to each other but are not limited to such a configuration.

In the foregoing description, the single-layer busbar 10 is described as being formed relatively long and the multi-layer busbar 20 as being formed relatively short, but are not limited to such a configuration. For example, the single-layer busbar 10 may also be formed relatively short, while the multi-layer busbar 20 may be formed relatively long.

The conductive structure according to the present embodiment may be also configured by suitably combining constituent elements of the embodiment described hereinabove or of modification examples.

In a conductive structure according to the present embodiment, a vehicle conductive path is configured from a single-layer busbar and a multi-layer busbar. The multi-layer busbar is configured by laminating a plurality of busbars which are formed as plates thinner than the single-layer busbar. Further, the laminated plurality of busbars of the multi-layer busbar are capable of mutual displacement relative to each other in a main body portion thereof, whereas, in a joining end thereof joined to the single-layer busbar, the laminated plurality of busbars are incapable of mutual, displacement relative to each other. Due to this configuration, while the single-layer busbar of the conductive structure functions as a rigid portion, the main body portion of the multi-layer busbar functions as a flexible portion, and on that basis, both can be reliably joined to each other via the joining end. As a result, the conductive structure affords the advantageous effect of enabling a conductive path to be appropriately provided. Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A conductive structure, comprising:
   a single-layer busbar that is formed in a plate shape and constitutes a conductive path of a vehicle; and
   a multi-layer busbar that is configured by laminating a plurality of busbars which are formed as plates thinner than the single-layer busbar and that is joined to an end of the single-layer busbar and constitutes the conductive path, wherein
   the multi-layer busbar includes a main body portion in which at least some of the laminated plurality of busbars are capable of mutual displacement relative to the busbars adjacent thereto, and a joining end located at an end of the main body portion on the single-layer busbar side and in which the laminated plurality of busbars are incapable of mutual displacement relative to each other, the joining end being joined to the end of the single-layer busbar.

2. The conductive structure according to claim 1, wherein
   the single-layer busbar has a higher rigidity than that of the main body portion of the multi-layer busbar and constitutes a route regulation portion that regulates an installation route, and
   the multi-layer busbar has a higher flexibility than that of the single-layer busbar and constitutes a deformation allowance portion that allows deformation.

3. The conductive structure according to claim 2, wherein
   the multi-layer busbar includes an attachment end that is located at the end of the main body portion on the side opposite to the joining end side, and in which the laminated plurality of busbars are incapable of mutual displacement relative to each other.

4. The conductive structure according to claim 3, further comprising:
   an insulating coating that covers and insulates outer surfaces of the single-layer busbar and the multi-layer busbar.

5. The conductive structure according to claim 3, wherein, in the multi-layer busbar, the laminated plurality of busbars are in mutual contact and are conductive.

6. The conductive structure according to claim 3, wherein a length along a direction of extension of the single-layer busbar is longer than a length along the direction of extension of the multi-layer busbar.

7. The conductive structure according to claim 2, further comprising:
   an insulating coating that covers and insulates outer surfaces of the single-layer busbar and the multi-layer busbar.

8. The conductive structure according to claim 7, wherein, in the multi-layer busbar, the laminated plurality of busbars are in mutual, contact, and are conductive.

9. The conductive structure according to claim 2, wherein, in the multi-layer busbar, the laminated plurality of busbars are in mutual contact and are conductive.

10. The conductive structure according to claim 2, wherein
   a length along a direction of extension of the single-layer busbar is longer than a length along the direction of extension of the multi-layer busbar.

11. The conductive structure according to claim 1, wherein
   the multi-layer busbar includes an attachment end that is located at the end of the main body portion on the side opposite to the joining end side, and in which the laminated plurality of busbars are incapable of mutual displacement relative to each other.

12. The conductive structure according to claim 11, further comprising:
an insulating coating that covers and insulates outer surfaces of the single-layer busbar and the multi-layer busbar.

13. The conductive structure according to claim 11, wherein,
in the multi-layer busbar, the laminated plurality of busbars are in mutual contact and are conductive.

14. The conductive structure according to claim 11, wherein
a length along a direction of extension of the single-layer busbar is longer than a length along the direction of extension of the multi-layer busbar.

15. The conductive structure according to claim 1, further comprising:
an insulating coating that covers and insulates outer surfaces of the single-layer busbar and the multi-layer busbar.

16. The conductive structure according to claim 15, wherein,
in the multi-layer busbar, the laminated plurality of busbars are in mutual contact and are conductive.

17. The conductive structure according to claim 15, wherein
a length along a direction of extension of the single-layer busbar is longer than a length along the direction of extension of the multi-layer busbar.

18. The conductive structure according to claim 1, wherein,
in the multi-layer busbar, the laminated plurality of busbars are in mutual contact and are conductive.

19. The conductive structure according to claim 18, wherein
a length along a direction of extension of the single-layer busbar is longer than a length along the direction of extension of the multi-layer busbar.

20. The conductive structure according to claim 1, wherein
a length along a direction of extension of the single-layer busbar is longer than a length along the direction of extension of the multi-layer busbar.

* * * * *